United States Patent [19]

Bratten

[11] 4,430,231

[45] Feb. 7, 1984

[54] FILTERING APPARATUS AND METHOD

[76] Inventor: Jack Bratten, 5970 St. James Dr., West Bloomfield, Mich. 48033

[21] Appl. No.: 405,524

[22] Filed: Aug. 5, 1982

[51] Int. Cl.³ .............................................. B01D 33/04
[52] U.S. Cl. .................................... 210/783; 210/386; 210/400
[58] Field of Search ............... 210/783, 400, 401, 350, 210/386; 162/360; 100/211, 212, 163 R, 163 B

[56] References Cited

U.S. PATENT DOCUMENTS 4,008,158  2/1977  Davis .................................. 210/400
4,153,550  5/1979  Lautrette ............................. 210/386

Primary Examiner—Frank Sever
Attorney, Agent, or Firm—John R. Benefiel

[57] ABSTRACT

A filtering apparatus and method is disclosed adapted to filter suspended solids from a liquid, consisting of a filter housing which receives a flexible belt filtering element into a filter chamber, the liquid to be passed through the belt to filter out solids. The flexible belt is movably mounted to be passed through end openings on either side of a filter chamber to enable removal of accumulated solids after each filter cycle. The end openings are sealed during filtering cycles by flexible tube segments extending across the openings which are pressurized to effect a seal and evacuated to allow removal of the belt. A series of such filters may be stacked together with a traveling roller assembly utilized for simultaneously moving the belts of each filter in and out of the chamber.

14 Claims, 7 Drawing Figures

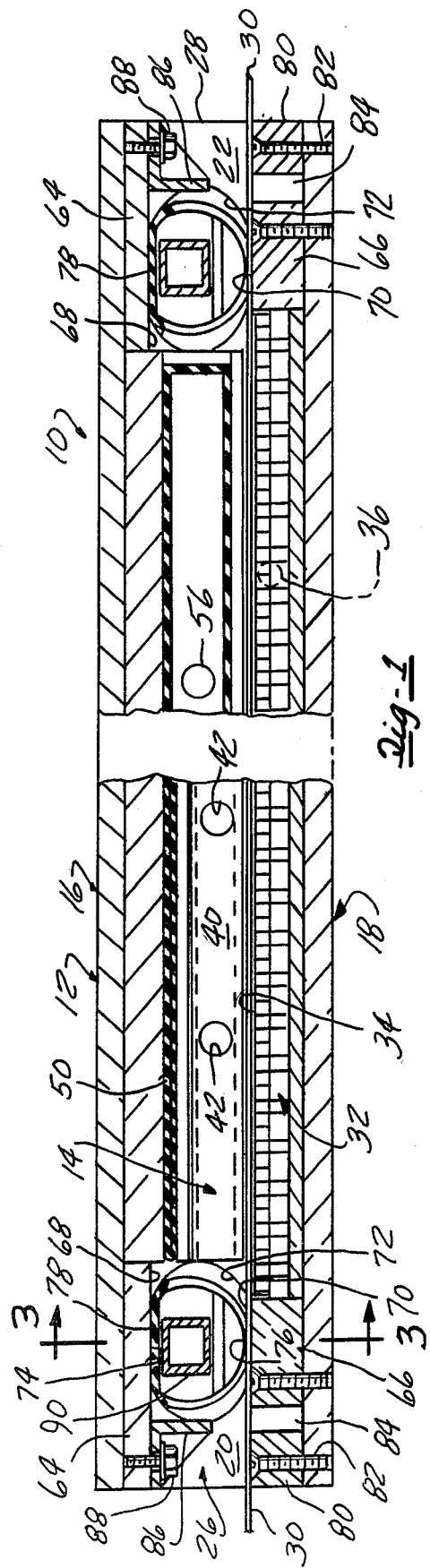
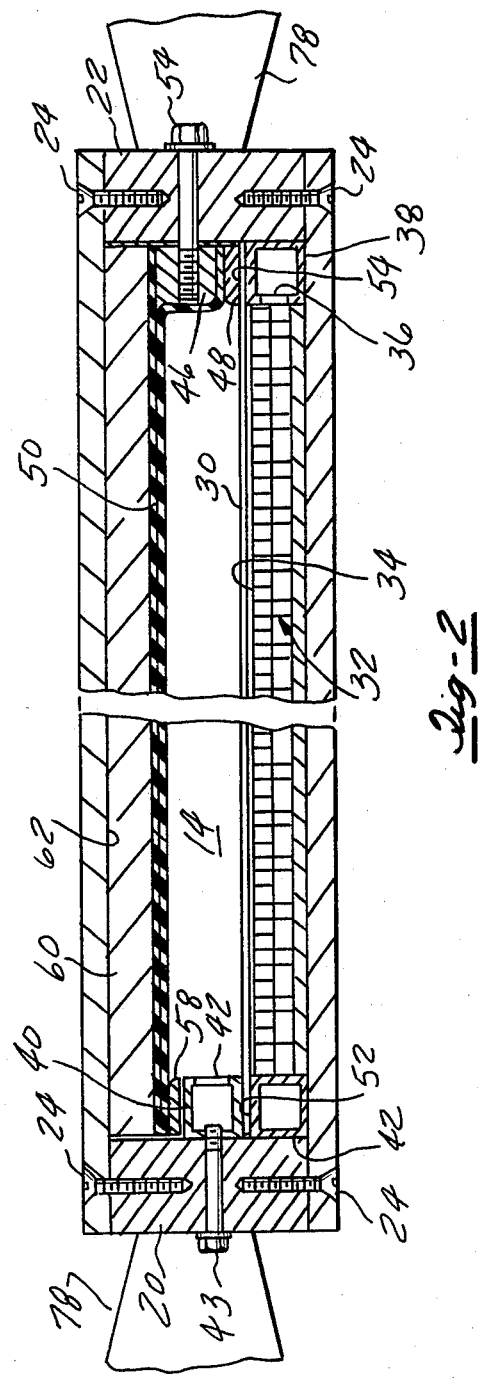

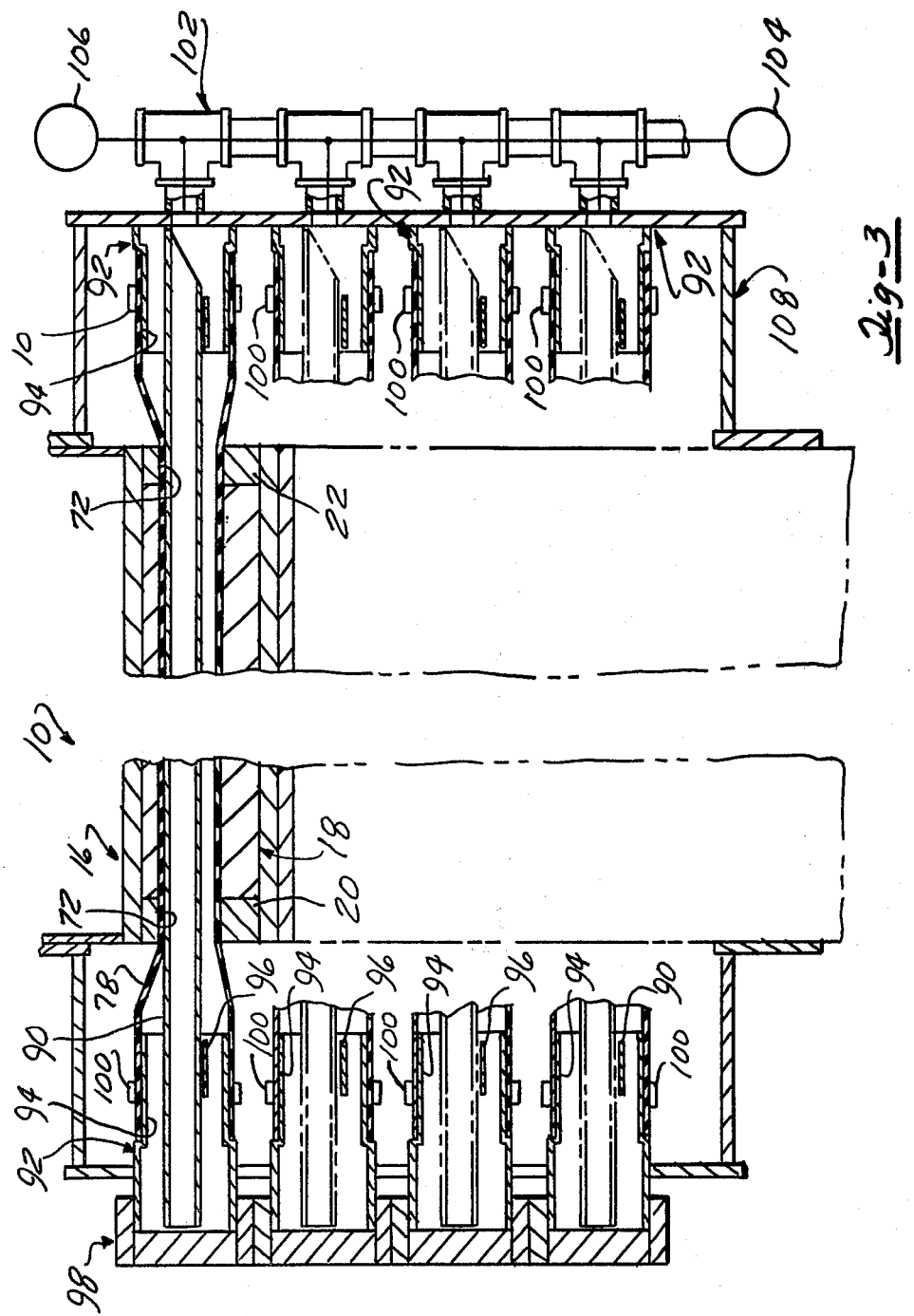

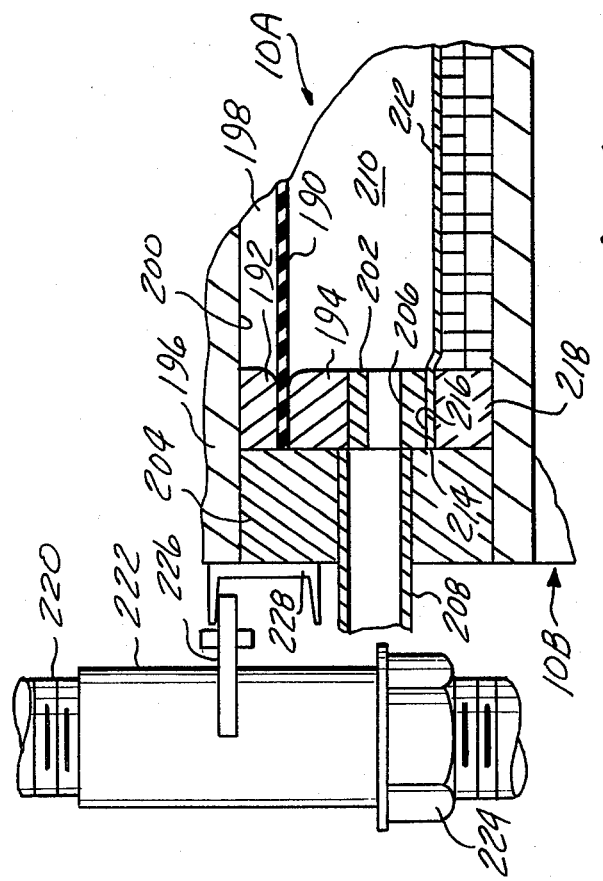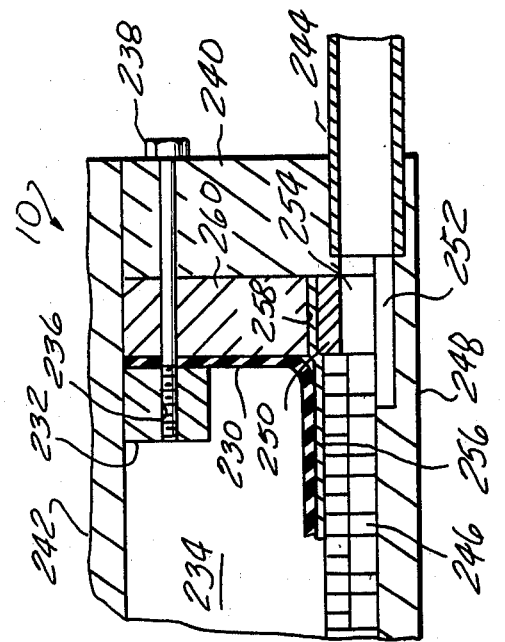

FILTERING APPARATUS AND METHOD

BACKGROUND DISCUSSION

The present invention is concerned with filtering apparatus and methods and more particularly, such apparatus and methods as are employed to remove suspended solids from a liquid such as in slurry and coal wash water de-watering, sewage sludge removal and other similar industrial processes.

Such applications are required to handle tremendous volumes of liquid and collected solids, and are preferably highly automated for efficient removal of the suspended solids.

One approach heretofore practiced has involved the use of a filtering chamber into which a belt type filtering element is moved to overlie a filtering bed. The filter chamber is sealed and the liquid to be filtered introduced above the belt and pressurized such as to flow through the belt and effect removal of the suspended solids. The filtered liquid is collected at an outlet beneath the belt. Upon a predetermined accumulation of filtered solids or "cake", the filter chamber is unsealed and the belt moved outwardly for removal of the accumulated cake preparatory to initiation of the next filtration cycle, and washing of the belt.

Due to the great volume of liquid typically entailed in such filtering operations, relatively large size filter chambers have been employed which are stacked one atop the other to produce adequate capacity.

In order to effect the sealing and unsealing of the filter chamber, upper and lower halves of the filter housing are separated to enable the filter belts to be moved outwardly after each filter cycle. Since such filter chambers are typically relatively large in size, even moderate filtering pressures produces enormous forces which must be absorbed by the clamping and unclamping mechanism.

The need for separation of the filtering housings in the stack also produces a relatively bulky structure. The clamping mechanism must effect a good seal upon closing of the housing moving together of the housing halves, and must resist considerable pressure in withstanding the hydraulic pressures and to effect a proper seal.

These requirements contribute to the considerable expense of such units. In order to avoid the necessity of the complex, costly mechanical apparatus, it has heretofore been proposed to utilize a tubular flexible seal passing about the opposing housing halves or plates which is inflated or otherwise pressurized in order to effect the seal and deflated in order to unseal the filter chambers.

Examples of this approach are disclosed in U.S. Pat. Nos. 3,899,426 and 3,478,879. However, this approach creates a problem in maintaining the position of the seal while resisting the relatively high hydraulic pressures exerted during the filtering cycle. Also, considerable difficulty is encountered in manufacturing a completely enclosing seal suitable for such high pressure applications.

In filters using a belt type filter element, there is often associated a relatively complex and bulky roller mechanism for receiving relatively long lengths of belt during the removal portion of the machine cycle. It would likewise be highly desirable to simplify this aspect of such apparatus.

Accordingly, it is the object of the present invention to provide a liquid filter apparatus and method of the type including a filter chamber into which is moved a flexible filter medium such as a filter belt, with the filter chamber subsequently sealed prior to the introduction of liquid to be filtered in which the sealing of the chamber is effected by simple and effective means.

It is a further object of the present invention to provide such a filtering apparatus and method which is relatively compact.

SUMMARY OF THE INVENTION

These and other objects of the present invention are achieved by an apparatus consisting of a rigid housing defining a filter chamber having openings on either side thereof and a flexible filter element moved into and out of these openings. The housing is constructed in sections fixed together, and sealing of the openings is effected by end seals consisting of segments of flexible tubing extending across each of the openings which are adapted to be pressurized during the filtering cycle to be forced against adjacent surfaces to seal the chamber openings.

Each of the flexible tube segments extend through side openings formed in side plates each comprising a part of each filter housing and chamber, such that pressurization of the tube segments forces their outer surface against the periphery of the side plate openings to effect a complete seal.

Each of the flexible tubing segments is depressurized and at least partially evacuated to cause a lifting of the lower side to enable the filter belt and accumulated solids or "cake" to be removed by transferring motion of the belt out through the chamber opening, and movement of a fresh section of belt into the filter chamber, preparatory to initiation of another filtration cycle.

Each of the tube segments is internally supported such as to maintain a clearance space between the lower side of each of the tube segments and the bottom surfaces defining in part each of the chamber openings which support may consist of an internally disposed rigid member extending through the length of each tube segment and passing into the interior of a rigid pipe coupling and secured therein by a cross piece. The pipe coupling provides the means for supplying pressurizing fluid to the interior of the flexible tube seal.

The tubing segments are each supported along their outer sides by means of rigid members mounted across the front of each chamber opening, located to engage the outer side surface of each tube segment enabling resistance to the pressures exerted by pressurization of the filter chamber with the liquid to be filtered.

The sides of the filter belt pass through slots on either side of the filter chamber defined by sealing surfaces on one upper side and an inlet manifold on the other.

The liquid to be filtered is advantageously introduced into the filter chamber through the manifold which has one or more openings located over the filter belt side such that the inflow of unfiltered liquid does not disturb the positioning of the belt filter against the sealing surface.

A de-watering diaphragm may also be mounted in the filter chamber which is pressurized after each filtration cycle to force the remaining liquid from the cake prior to unsealing of the fluid pressure seals and transferring out the filter belt element for removal of the cake.

Pressurizing of the flexible tube segments may be achieved by a system including a filling of each of the tube seals with liquid initially with a low pressure pump and then highly pressurized with a pneumatically driven booster pump. Alternatively, the tube segments may be pressurized by the use of high pressure air. Seal evacuation is achieved by an outflow producing a vacuum within each of the tube seals to cause the lower portions to lift-up as the tubular seals collapse, to create a clearance space sufficient to allow removal of the filter belt and accumulated filter cake on the top surface thereof.

The filter apparatus may be provided by a vertically stacked array of filter units each sealed in like fashion, with a manifolding employed to enable pressurizing of all of the filter chamber seals. The stacked array may be disassembled and an individual filter unit removed by means of a support mechanism incorporated in the apparatus.

The cycled motion of the filter belt out of the filter chamber may be achieved by a simplified mechanism consisting of a series of rollers mounted on a travelling beam which when cycled, causes an endwise movement of belts out of the filter chamber after each filtering cycle to allow removal of the cake and spray wash cleaning of the filter belts by suitable spray pipe arrangement.

A shutter arrangement may also be employed which allows the removed solids to pass through movable louvers, with a subsequent washing step after closing of the diverter shutter enabling collection of the washed liquid in a water trough.

BRIEF DESCRIPTION OF THE DRAWINGS

FIG. 1 is a sectional view through a single filter unit.

FIG. 2 is a sectional view taken through the lines 2—2 of the filtering unit shown in FIG. 1.

FIG. 3 is a simplified sectional view taken through the single unit shown in FIG. 1 of a stacked array of such filtering units assembled together with a partially sectional view of the manifolding arrangement employed to pressurize and depressurize the tube segment seals within the filter units.

FIG. 6 is a fragmentary partially sectional view of a single filter unit depicting an alternate construction thereof together with an arrangement for supporting an individual filter unit in a stacked array.

FIG. 7 is a fragmentary partially sectional view depicting another alternate construction of the filter unit.

DETAILED DESCRIPTION

Figure 4:
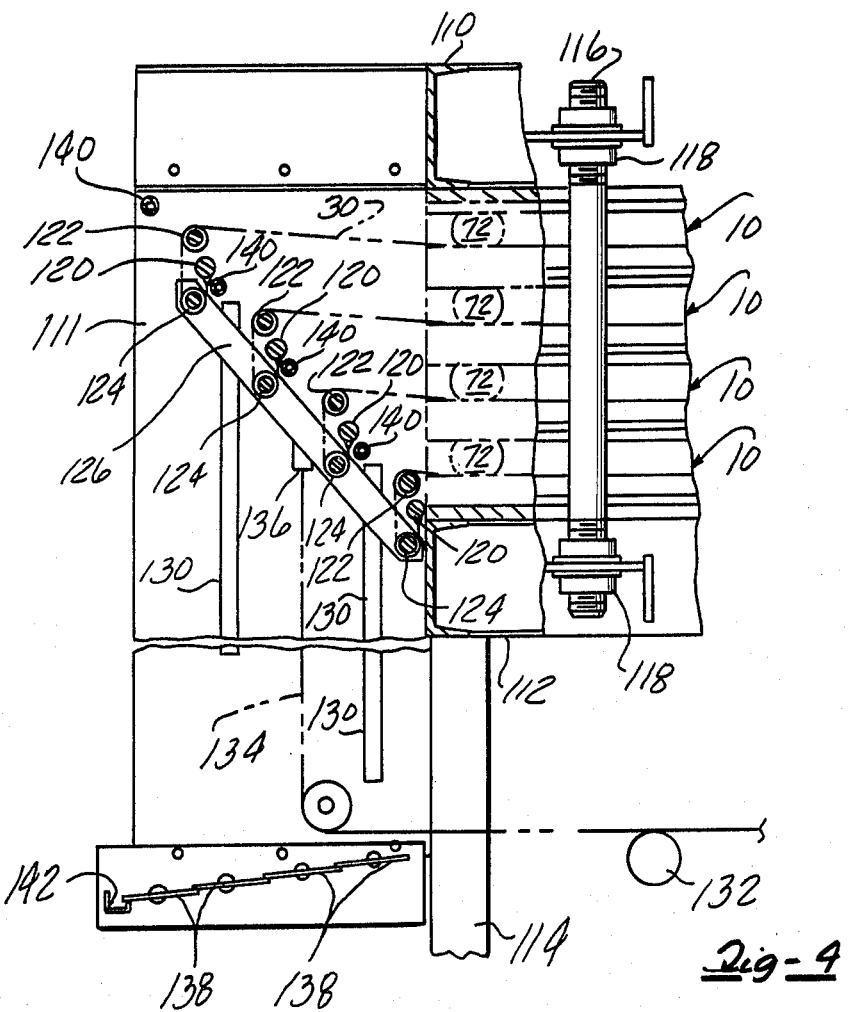
FIG. 4 is a simplified fragmentary partially sectional view of the stacked array of filter units shown in FIG. 3 depicting in partially diagrammatic form the belt conveying and cleaning mechanism.

In the following detailed description certain specific terminology will be employed for the sake of clarity and a particular embodiment described to provide a clear understanding of the invention. It is to be understood that the same is not intended to be limiting and indeed should not be so construed inasmuch as the invention is capable of taking many forms and variations within the scope of the appended claims.

Referring to FIG. 1, an individual filtering unit 10 consists of a generally rectangular filter housing 12 constructed of relatively rigid materials such as metal or suitable high strength plastic. The housing 12 is provided with an internal filter chamber 14 (see FIG. 2); and also includes a top member 16 and a bottom member 18 and a pair of side members 20 and 22 each joined together into a unitary structure as by the use of fasteners 24.

Side members are not provided at the remaining opposite sides of the top and bottom members 16 and 18 to thereby establish a pair of generally elongated filter chamber openings 26 and 28 on either side of the filter housing 12.

The filter chamber openings 26 and 28 are adapted to receive a filter element disposed horizontally in the filter chamber 14, and consists of a flexible belt 30 of a porous flexible material such as high strength canvas or other suitable woven material to act as a filter element and also serve to convey the filter "cake" or accumulated solids out of the filter chamber 14 after each filtration cycle. The filter belt 30 is located at the bottom of filter chamber 14 defined by the space thereabove.

Support means are also provided for the undersurface of the filter belt 30 which advantageously consists of a commercially available plastic molded support grid 32 located within the filter housing 12 such as to receive on its upper surface 34 the filter element 30.

The support grid 32 is provided with numerous clearance spaces between the grid elements thereof such as to receive fluid flow passing through said filter belt 30, and suitable cross openings are also provided in the manner well known to those skilled in the art, enabling collection of the filtered liquid which passes outwardly to be collected by an outlet means consisting of an outlet opening 36, and an outlet header 38, in communication with a suitable outlet passage (not shown) for collection of the filtered liquid.

Inlet means are also provided for introducing the liquid to be filtered into the filter chamber 14, i.e., the space above the filter element 30, here taking the form of an inlet header 40 and a series of inlet openings 42 such that the liquid to be filtered passes into the filter chamber 14 through the inlet openings 42.

The inlet header 40 overlies a spacer box member 44 with a clearance space sufficient to enable free passage of the filter belt 30 therebetween. Similarly the outlet header 38 underlies a spacer block 46 and mounting strip 48, with a space therebetween each for mounting a de-watering diaphragm 50 as will be described hereinafter.

The inlet manifold 42 is secured to the side member 20 as by machine bolts 43 while the spacer block 46 is secured by means of machine bolts 54.

Thus, the filter belt 30 has its outboard edges overlying sealing surfaces 52 and 54 respectively such that upon pressurization of the space above the filter belt 30, an adequate sealing engagement will result.

The location of the inlet passages 42 inward from the side edges of the filter element 30 ensures that liquid inflow does not have a tendency to upset the sealing engagement of the surface 52, such that a reasonably effective seal can be provided to allow movement of the filter belt 30 into and out of the filter chamber 14.

As noted, a dewatering diaphragm 50 is provided formed by an envelope of relatively flexible material such as rubber, nylon or other suitable flexible and tough material. The dewatering diaphragm 50 is in a collapsed state as shown in the left-hand side of FIG. 1 and in FIG. 2, but may be inflated in order to force the remaining liquid from the space above the filter belt 30 at the end of each filtration cycle, in the matter well known to those skilled in the art.

This is shown in the right-hand side of FIG. 1. A pressurizing inlet 56 is provided for this purpose in communication with the interior space of the diaphragm 50. The diaphragm 50 is mounted by having its open edges clamped between a shim spacer 58 and a spacer plate 60 mounted between the interior surface 62 under surface of the top member 16 so as to securely clamp and seal the edges of the diaphragm 50.

Each of the chamber openings 26 and 28 has a perimeter defined in part by a top spacer member 64 and bottom spacer member 66 having a respective top surface 68 and bottom surface 70 extending across the length of the elongated openings 26 and 28.

Each of the side plates 20 and 22 are formed with generally oval shaped openings 72. Each of the openings 72 are in alignment with each other, and also each include top and bottom sides 74 and 76 thereof, substantially flush with the top surface 68 and bottom surface 70 respectively of the top and bottom members 64 and 66.

Sealing means are provided according to the present invention for sealing each of the openings 26 and 28. The sealing means each includes a flexible tube segment 78, each configured, upon being pressurized, to create a sealing engagement with the top and bottom surfaces 68 and 70, as well as the internal surfaces of the perimeter of the side openings 72 such as to effect a complete seal of the chamber openings 26 and 28 preparatory to initiation of each filtering cycle. The flexible tube segments may be provided by a commercially available industrial hose, which is suitably reinforced to resist pressures on the order of 150 p.s.i.

In connection with such sealing engagement the filter belt 30 is forced into sealing engagement with the bottom surface 70 to either side thereof such as to allow the filter element 30 to project outwardly through the openings as for attachment to a filter belt conveying system which will be described hereinafter.

Forward blocks 80 are each secured to the bottom plate 18 by machine screws 82 spaced apart from said bottom members 66 with the gap 84 therebetween serving as a drain groove for collecting filter liquid and a suitable drain connection provided (not shown).

Each of the sealing tube segments 78 are buttressed to resist the outward pressure exerted thereon upon pressurization of the filtering chamber 14. This is achieved by the use of elongated angle members 86 secured across each opening 26 and 28 by machine bolts 88, which angle members 86 are positioned to engage the outer lateral surface of a respective sealing tube segment 78, to prevent distension thereof in response to the internal pressure exerted in the filter chamber 14.

Each of the sealing tube segments 78 is at least partially evacuated after each filter cycle to provide a clearance opening sufficient to allow removal of the filter belt 30 together with the accumulated solids on the top surface thereof. In order to create a clearance space above the belt surface 70 each of the sealing tube segments 78 is internally supported by a relatively rigid elongated member 90 passing through the openings 26 and 28 and out through the side openings 72. The members 90 are located in the upper region of each of the openings 72 such that the interior surface of each of the hose segments 78 on its upper side is held by the upper side of the elongated members 90. Upon evacuation, sagging of the tube segment 78 is thereby prevented and a clearance space is created above the bottom surface 70 of either opening 26 and 28.

As seen in FIG. 3 each end of the sealing hose segment 78 is received over pipe nipples 92. This Figure depicts a vertically stacked array of filter units 10, provided in order to create an increased filter capacity for a give application as would be contemplated for typical industrial applications.

It can be seen that each of the sealing tube segments 78 extend from the generally circular section pipe nipples 92 into the generally oval side openings 72 to ensure tight sealing engagement with the perimeter of the internal surface thereof upon pressurization.

Elongated rigid member 90 is supported within the interior of each pipe nipple 92 by means of a bridging or cross plate 96. Means are provided for obtaining access to the interior of the couplings 92 to enable removal of the given sealing hose segment 78 such as an array of couplings 98 of the type commercially available under the tradename Victaulic (TM). Band or other type couplings 100 are employed to securely clamp the ends of the tube segments 78 to the pipe nipples 92.

A manifold 102 is provided for connecting the interior of each pipe nipple 92 to a pressurization circuit 104 to be hereinafter described in further detail.

A vent 106 also being provided as part of the control circuit for evacuation of each of the sealing tube segment 78. The filter units 10 are arrayed in a suitable mounting frame work 108 as seen in FIG. 4, supported on a top box frame 110 and bottom box frame 112 in turn supported on a leg framework 114. Tie rods 116 may be provided for clamping together the filter units 10 and the stacked array at assembly.

Suitable tightening nut assemblies 118 may be provided for this purpose secured to the upper frame 110 and bottom frame 112 respectively.

Each of the filter belts 30 may be provided with a conveying mechanism for movement in and out of the filter chambers 14, for removal of the accumulated filter cake and washing of each of the belts 30 to clear the filtered particulates after each filter cycle.

The filter belts 30 have either end affixed to stationary bar or rod 120, and passes about a stationary roller 122 and a movably mounted roller 124. Each movably mounted roller 124 is carried by a traversing bar 126 mounted for up and down movement on a pair of guide rods 130.

A similar arrangement is provided at the opposite side of the array. A suitable actuating winch 132 is provided to operate a chain or cable 134 which is joined at either end to a respective hitch 136 joined to the traversing bar 126.

Upon actuation of the control means to cause evacuation of each sealing tube segments 78 at the end of each filtering cycle, winch 132 is operated to move a length of the respective filter elements 30 out of the filter chamber 10 together with the accumulated cake and corresponding movement of a fresh section of the belt from the opposite side.

Each length of the filter belt 30 passes about the fixed rollers 122 and moving rollers 124, to thereby cause the cake to be dislodged, which cake falls downwardly to be collected. A series of diverter shutters 138 is provided which opens during this step of the cycle such as to enable the removed cake to pass therethrough for collection in a suitable collection means (not shown). Upon full descent of the traverse bars 126, wash nozzles 140 distributed along spray tubes 142 are actuated with a cleaning water spray or other suitable liquid. The wash water is thus diverted to a wash water collection trough 144 without rewetting of the cake or the conveyor mechanisms below.

Figure 5:
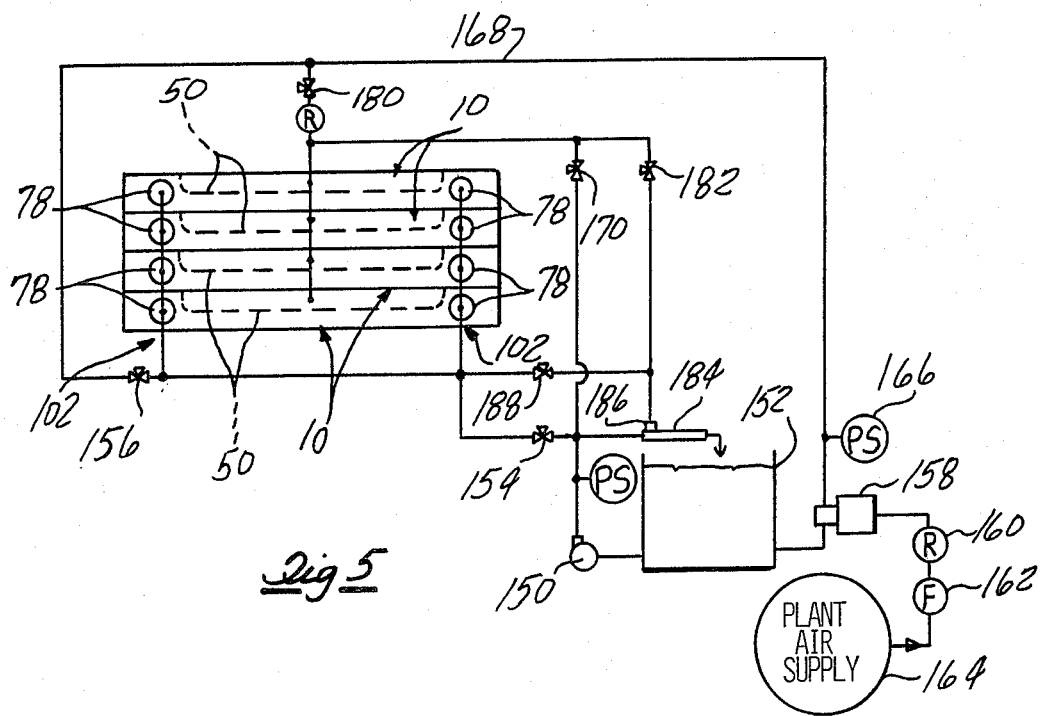
FIG. 5 is a diagrammatic representation of the fluid pressure circuit utilized for effecting pressurization and depressurization of the flexible sealing tube segments as well as the dewatering diaphragms.

Referring to FIG. 5, a schematic diagram of the control circuit associated with the sealing tube segments 78 is depicted. A relatively low pressure supply pump 150 has its inlet in communication with a source of liquid shown as water tank 152.

In the first step in the pressurizing cycle, a valve 154 is opened placing the outlet of the hydraulic supply pump 150 in communication with the interior of each of the tube segments 78 via the manifold system 102.

This causes each of the tube segments 78 to be filled with liquid, after which the valve 154 is closed and valve 156 is opened which enables the pressure in the sealing tubes to be increased to a high pressure by a high pressure booster pump 158. The booster pump 158 is supplied with air under pressure via a regulator 160 and filter 62 in communication with an air supply 164, the booster pump 158 receiving liquid from tank 152 as shown providing relatively high pressure liquid, i.e., 150 p.s.i. Alternatively, the high pressure pump 158 may be motor driven.

Pressure sensing safety switch 166 is included to cut off system operation in the event of low pressure.

The relatively high pressure liquid, i.e., 150 p.s.i., is communicated via the passage 168 to the interior of each of the sealing tube segments 78 to fully expand the same into tight sealing engagement as described above with the openings 26 and 28 of each of the filter units 10. At this point, the filtration cycle takes place with supply of liquid to be directed into the filtration chambers 14 in the manner well known to those skilled in the art.

After the filtration cycle, a valve 170 is opened, which causes each of the diaphragm chambers 50 to be filled with liquid. Thereafter, the valve 170 is closed and valve 80 opened to fully pressurize the interior of the diaphragms 50 causing de-watering of the filter cake. Subsequently, the valve 180 is closed and valve 182 opened placing the interior of each of the diaphragms 50 in communication with a venturi flow unit 184, which develops a vacuum at the port 86 to thus evacuate liquid from each of the diaphragms 50 causing them to move to their collapsed state.

Finally, valve 188 is opened after closing of valve 182 to evacuate each of the interiors of the sealing tube segments 78. This causes collapse of each of the sealing tube segments 78. Due to the interior support thereof, evacuation develops a clearance above the surface 70, to enable, upon cycling of the belt conveying mechanism withdrawal of the filter belts 30 for removal of the cake and washing as described above and initiation of another filtering cycle.

In an alternative operating arrangement, the sealing tubes and diaphragms may be pressurized with high pressure air and will operate in a similar manner as previously described.

Referring to FIG. 6, an alternative construction is disclosed in which a single ply diaphragm 190 is employed clamped between clamping bars 192 snd 194 upon assembly of the top plate 196 and diaphragm chamber 198 between the diaphragm 190 and the interior surface 200 of the top plate 196.

A side bar 202 is provided secured to a side plate 204 having an outlet 206 in communication with inlet passage 208 for filling of the filtration chamber 210 located above the filter belt 212. A clearance space 214 in similar fashion is provided for passage of the filter belt 212 with the outlet 206 projecting thereover in order to ensure good sealing of the under surface of the filter element 212 with upper surface 216 of the spacer bar 218.

To enable removal of the individual unit 10 from a vertical stacked array, a support arrangement is shown in FIG. 6, consisting of a threaded standard 220, and a traveling bar 222 vertically positioned by means of a nut element 224. A similar assembly is provided at each corner of the filter unit 10.

A welded projection 226 engages the side rail 228 enabling support of the filtration unit 10 and all those above upon threading advance of the nut 224 on either side enabling removal of any filtration unit 10b located immediately beneath the filter element 10a.

FIG. 7 shows another variation for producing clamping of a single ply diaphragm 230, consisting of a clamping bar 232 located about an interior of the filter chamber 234 which has threaded bores 236 engaged by bolts 238 extending through a side member 240 enable clamping engagement independently of assembly of the top plate 242. An outlet passage 244 is also provided located beneath the grid 246 and aligned with a channel 252 in the bottom plate 248. A spacer plate 250 is provided with openings 254, for enabling directing of the filtered liquid to the outlet passage 244.

The filter belt 256 passes into a clearance slot 258 located between the side plate 260 and the spacer 250 in similar fashion to the previously described embodiment.

Accordingly, it can be seen that the above recited objects of the present invention are achieved by the use of sealing tube segments extending across the filter chamber openings which enables much more effective use of flexible tube sealing. Such sealing in turn allows use of vertical stacked arrays of filter units without the elaborate complex mechanisms required to resist the unbalanced hydraulic pressure forces which is now currently employed for such filtering units.

The flexible tube segment type sealing may be employed with relatively simple yet reliable hydraulic-pneumatic system. The provision of interior supports for each of the tube segments, upon evacuation of the tube segments, produces the necessary clearance for removal of the cake in the belt conveyor filter element type units. The conveyor system for the belt units is likewise relatively compact and simple.

The configuration of the belt passing into slots together with the inlet flow being directed to the interior of the filter chamber ensures an adequate sealing of the filter belt without the need for clamping or otherwise securing the filter element edges during the filtration cycle.

Many variations in the specifics such as the use of various alternate materials for the tube segments, housings, etc., or various alternate flow passage configurations, or pressurizing circuits are all, of course, possible within the scope of the invention.

1. A filtering apparatus comprising the elements of:
a rigid filter housing including an internal filter chamber;
said filter housing defining at least one elongated opening extending into said chamber;
a filter element adapted to be passed into said filter chamber through said opening so as to be movable into and out of said filter chamber;
said filter element located beneath a space in said filter chamber;

inlet means for directing fluid to be filtered under pressure into said filter chamber space above said filter element;

filter element support means mounted within said housing and having an upper face located to receive said filter element thereon, said support means including clearance spaces enabled to receive fluid flow through said filter element;

outlet means for collecting said fluid flow passed through said filter element and support means;

sealing means for sealing said filter chamber opening comprising a flexible tube segment and means mounting said tube segment extending across and within said opening, said tube segment configured to move into sealing engagement with the perimeter of said opening upon pressurization thereof;

said elongated opening defined by opposing top and bottom surfaces, and a pair of side members wherein said side members are each formed with a side opening through which each end of said tube segment passes to be coextensive with said top and bottom opposing surfaces, each of said side openings having an internal surface configured to be sealed by said respective tube segment ends upon pressurization thereof said elements being relatively positioned to enable sealing of said filter housing openings to be achieved solely by sealing engagement of said tube segment with said top and bottom member opposing surfaces and with said side openings internal surface;

control means for selectively pressurizing or depressurizing said tube segment, to thereby controllably seal said opening and said side openings during operation of said filtering apparatus.

2. The filtering apparatus according to claim 1 wherein said side openings are configured with top and bottom side surfaces each substantially flush with a respective one of said top and bottom member opposing surfaces.

3. The filtering apparatus according to claim 1 wherein said control means further includes means for evacuating the interior of said tube segment after depressurization thereof.

4. The filtering apparatus according to claim 3 further including;
a relatively rigid elongated member located within and extending through said flexible tube segment;
further including means for supporting said relatively rigid elongated member in the upper region of said flexible tube to thereby support said tube upon evacuation thereof to ensure development of a bottom clearance space upon evacuation of said tube enabling removal of said filter element from said filter chamber.

5. The filtering apparatus according to claim 4 wherein said means includes means mounting said tube segment pipe nipples located on either side of said tube segment and receiving said tube segment ends thereover and wherein said control means includes means for pressurizing the interior of said pipe nipples to thereby pressurize said tube segment.

6. The filtering apparatus according to claim 5 wherein said means for supporting said relatively rigid elongated members comprises support member mounted within the interior of each of said pipe nipples, each supporting one end of said relatively rigid elongated member.

7. The filtering apparatus according to claim 3 wherein said control means includes means for initially causing liquid flow into the interior of said tube segments to thereby fill the tube segment with the liquid and subsequently generating relatively higher pressure to fully pressurize said tube segment into sealing engagement.

8. The filtering apparatus according to claim 1 wherein said filter element comprises a flexible belt and further including;
a slot on either side of said filter chamber and wherein said filter belt passes into said filter chamber with sides disposed in said slots and wherein said inlet means includes an inlet passage directing inlet flow into the interior of said filter chamber over said filter belt whereby said inlet flow is directed to the intermediate regions of said filter belt to assure sealing engagement of said filter belt with said support means.

9. The filtering apparatus according to claim 8 wherein said housing is mounted to dispose said filter belt horizontally in said filter chamber further including a belt conveying system for moving said belt into and out of said filter chamber after and prior to initiation of each filter cycle, said belt conveyor system comprising:
a fixed bar mounted extending across the width of said filter element and having secured thereto an end of said filter element;
a movable roller extending across an intermediate the width of said filter belt at a point intermediate its length normally disposed outside of said filter chamber;
and also including means for moving vertically said movable roller to thereby cause said filter element disposed in said filter chamber to be moved out of said filter chamber.

10. The filtering apparatus according to claim 1 wherein said filter housing is provided with a pair of said elongated openings located on either side of said filter housing and wherein said filter element comprises a flexible filter belt having ends thereof disposed extending out through a respective elongated opening, and further including means for moving said filter belt into and out of said filter chamber, and wherein a sealing tube segment is provided extending across each of said elongated openings and wherein said control means includes the means for pressurizing each of said tube segments prior to the initiation of a filtering cycle including means for filling each of said tube segments with a liquid and pressurizing the same to produce said tube segment pressurization thereof and further includes means for evacuating each of said tube segments after each filtration cycle to cause collapse of each of said tube segments and enable conveying of said filter element out of said filter chamber.

11. The filtering apparatus according to claim 1 further including a plurality of said filtering units arranged in a vertical stack one atop the other, further including means for supporting each of said filtering units of a preselected filter units in said stacked array for removal of a filter unit therebelow in said array, said arrangement including a series of vertical standards, including a projecting element and means for adjustably moving said projecting element into engagement with a given filter unit in said stacked array to assume the weight thereof of said filter unit and those units thereabove to enable removal of the filtering unit below.

12. The filtering apparatus according to claim 1 further including a diaphragm disposed within said filter chamber and means for clamping the perimeter of said diaphragm such as to define a pressure chamber at least in part by said diaphragm and further including means for pressurizing selectively said diaphragm, said diaphragm located to extend above said filter chamber space such that upon pressurization of said pressure chamber, distension of said diaphragm enables removal of liquid from accumulated solids on said filter element after each filtration cycle.

13. The filtering apparatus according to claim 1 further including a tube segment support member mounted to said filter housing extending across said elongated opening having an inside surface in engagement with the lateral surface of said tube segment to provide lateral support therefor.

14. A method of filtering comprising the steps of disposing a flexible element within the interior of a substantially rigid filter housing, said filter housing having an elongated opening through which said flexible filter element is disposed during a filtration cycle, with a filter chamber defined within said filtering housing above the upper surface of said flexible filtering element;

disposing said flexible filtering element overlying a support which is adapted to receive flow through said filter element;

sealing said elongated opening by the step of pressurizing a flexible tube segment disposed within said elongated opening extending thereacross, said flexible tube segment being passed through a pair of side openings formed in said housing adjacent said elongated housing, such that upon pressurization the exterior thereof moves into sealing engagement with said filter element and said surfaces of said elongated opening and said side openings;

establishing a filter cycle by directing a flow of liquid into said filter chamber and collecting the filtered liquid after passing through said filter elements;

depressurizing and at least partially evacuating said tube segment after each filtration cycle;

moving said filter element with the accumulated solids thereon out of said filter chamber and removing said accumulated solids.

* * * * *